United States Patent [19]

Kato

[11] 4,437,162

[45] Mar. 13, 1984

[54] RESIDUAL LIQUID METER USING COMPUTER RESPONSIVE TO MEASUREMENTS OF LIQUID LEVEL AND FLOW

[75] Inventor: Yoshiaki Kato, Fujisawa, Japan

[73] Assignee: Nissan Motor Company, Limited, Kanagawa, Japan

[21] Appl. No.: 253,884

[22] Filed: Apr. 13, 1981

[30] Foreign Application Priority Data

Apr. 14, 1980 [JP] Japan .............................. 55-49339[U]

[51] Int. Cl.$^3$ ........................................... G01M 13/26
[52] U.S. Cl. ..................................... 364/442; 73/113; 340/618; 364/424; 364/509
[58] Field of Search ....................... 364/424, 442, 509; 235/92 FL; 73/113, 114, 242; 377/21; 340/618

[56] References Cited

U.S. PATENT DOCUMENTS

| 2,685,201 | 8/1954 | Le Clair | 73/242 |
| 3,167,398 | 1/1965 | Whittington | 73/242 |
| 3,589,176 | 6/1971 | Wellons | 73/113 |
| 4,043,198 | 8/1977 | Stillwell et al. | 73/242 |
| 4,046,998 | 9/1977 | Kuno et al. | 364/442 |
| 4,217,644 | 8/1980 | Kato et al. | 364/442 |

Primary Examiner—Errol A. Krass
Attorney, Agent, or Firm—Lowe, King, Price & Becker

[57] ABSTRACT

An automotive vehicle residual-fuel meter uses a microcomputer into which a signal indicating initial fuel tank liquid level is set. The initial setting is reduced in response to fuel consumption pulses derived from a ball-oscillation flow meter. The computer drives a residual fuel indicator. To increase the residual fuel quantity indication accuracy, a plurality of fuel level sensors, such as thermistors, correct the residual fuel indicator.

13 Claims, 6 Drawing Figures

PRIOR-ART

RESIDUAL LIQUID METER USING COMPUTER RESPONSIVE TO MEASUREMENTS OF LIQUID LEVEL AND FLOW

BACKGROUND OF THE INVENTION

1. Field of the Invention

The present invention relates generally to a residual liquid meter, and more particularly to a residual liquid meter including a microcomputer responsive to signals indicative of liquid level and flow to indicate the amount of liquid remaining in a reservoir.

2. Description of the Prior Art

One type of residual liquid meter, e.g., automotive vehicle fuel tank meters, use a float with a brush which slides moved up and down in contact with a film resistor surface according to liquid changes. The basic problems with such meters are as follows:

(1) there is an unstable connection between the brush on the float and the film resistor on a printed board;

(2) the up-and-down movement of the float in response to changes in liquid level is slow because of friction produced by the many moving parts used in the residual fuel meter; and (3) an accurate measurement of the residual liquid is difficult when the liquid level tilts, as frequently occurs in automotive fuel tanks.

Therefore, it is difficult to measure accurately the quantity of residual fuel within the fuel tank of an automotive vehicle by conventional methods.

A more detailed description of the prior-art residual fuel meter is made with reference to FIG. 1 under DETAILED DESCRIPTION.

SUMMARY OF THE INVENTION

With these problems in mind therefore, it is the primary object of the present invention to provide a new and improved residual liquid meter, particularly for an automotive vehicle, which can measure the fuel level with a high accuracy and a fast response time without the use of any brush or film resistor, that is, without the use of any sliding electrical parts.

To achieve the above-mentioned object, the residual liquid meter of the present invention comprises a microcomputer for storing necessary data and executing necessary arithmetic operations in addition to a flow meter and a plurality of fuel level sensors.

In the residual liquid meter according to the present invention an initial liquid quantity is preset and stored, the quantity of liquid consumed is measured by a flow meter, the residual liquid quantity is calculated by the computer, and the residual liquid quantity is corrected whenever the liquid level sensors derive detection signals. It is thereby possible to increase the accuracy of the liquid level measurement, even when the liquid level is tilted, with a fast response and a superior durability.

BRIEF DESCRIPTION OF THE DRAWINGS

The features and advantages of the residual fuel meter according to the present invention will be more clearly appreciated from the following description taken in conjunction with the accompanying drawings in which like reference numerals designate corresponding elements and in which.

BRIEF DESCRIPTION OF THE PREFERRED EMBODIMENTS

To facilitate understanding of the present invention, a brief reference is made to a prior-art residual fuel meter used to measure the quantity of residual fuel within a fuel tank of an automotive vehicle.

Figure 1:
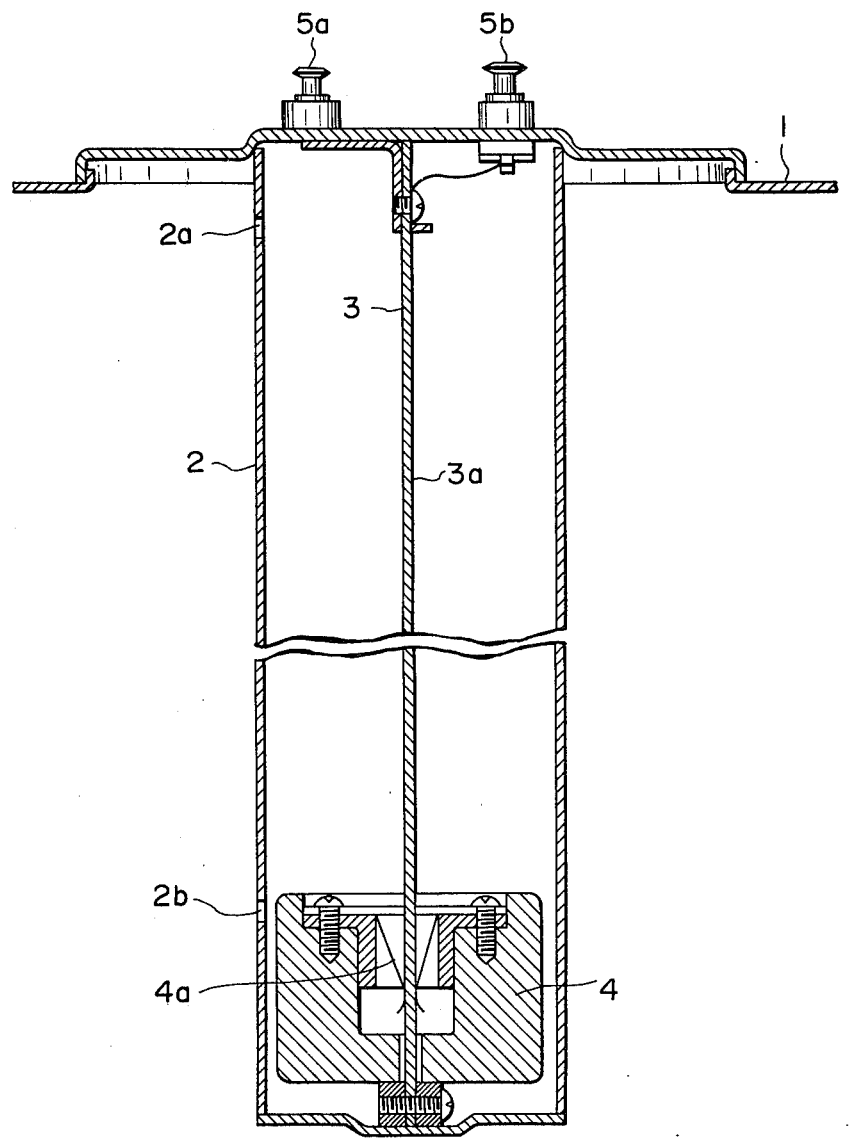
FIG. 1 is a cross sectional view of the main portion of a prior-art residual fuel meter.

FIG. 1 is an illustration of a typical prior-art residual fuel meter. In FIG. 1, the residual fuel meter comprises a ripple, i.e., wave, preventing outer cylinder 2 provided inside a fuel tank 1, a printed board 3 on which a vertical film resistor 3a is printed at the middle thereof and a float 4 slidably fitted on the printed board 3.

When the fuel level changes and the float 4 moves up or down, a brush 4a integrally provided on the float 4 slides in contact with the surface of the film resistor 3a. The change in resistance of the resistor 3a is electrically detected through a pair of terminals 5a and 5b to indicate the quantity of residual fuel. In this meter, there are provided two holes 2a and 2b through the wall of the cylinder 2 to afford communication between the inside and the outside.

The prior-art residual fuel meter thus constructed has several faults as previously described under Description of Prior Art.

In view of the above description, reference is now made to FIGS. 2 to 6.

Figure 2:
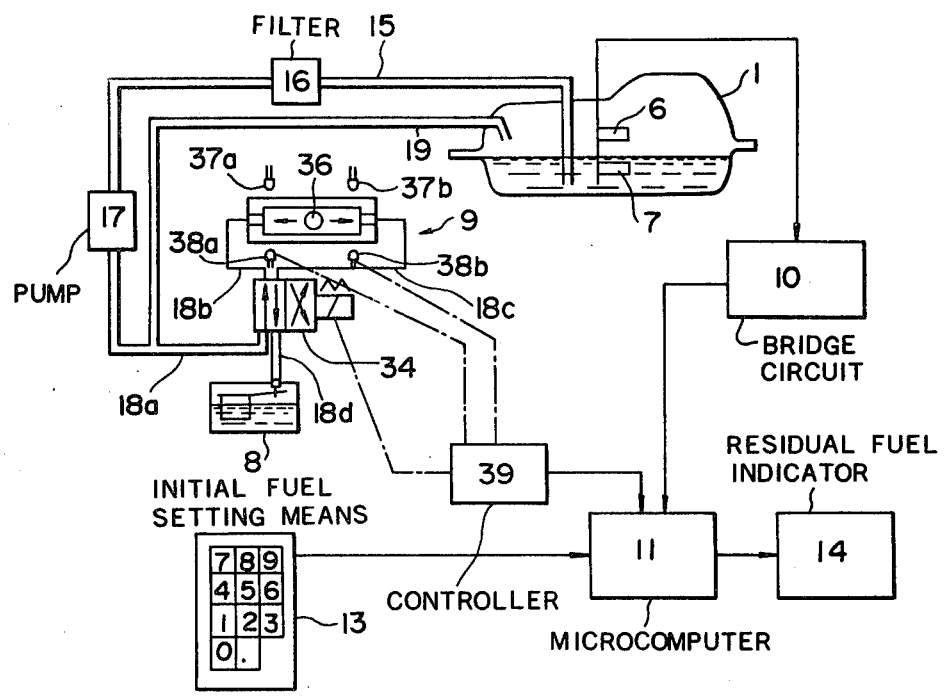
FIG. 2 is a schematic block diagram of a residual fuel meter according to the present invention.

FIG. 2 is a schematic diagram of a preferred embodiment of the present invention. In this embodiment, there are provided fuel level sensors 6 and 7, such as thermistors, fixed at predetermined fuel levels (at for instance a position indicating 40 liters and a position indicating 10 liters), and a ball-oscillation flow meter 9 provided upstream of the float chamber 8 of the carburetor and downstream of fuel tank 1.

In the ball-oscillation flow meter 9 described infra in more detail, a ball 36 oscillates to and fro with the fuel within a bore defined inside a cylinder block. When the ball 36 reaches either end of the bore, the ball position is detected by either of two pairs of light-emitting and light-receiving elements 37a and 38a, or 37b and 38b.

Figure 3:
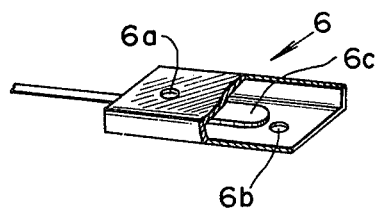
FIG. 3 is a perspective fragmentary broken view of a fuel level sensor used with the residual flow meter according to the present invention.

The liquid level sensors 6 or 7, as depicted in FIG. 3, are constructed by disposing a thermistor 6c horizontally within a protective casing 6 having small holes 6a and 6b on both the upper and lower surfaces thereof. Such a protective casing prevents the liquid level from changing due to external forces. Since the resistance of a thermistor changes according to the ambient temperature, the thermistor detects the fuel level. The thermistor has different resistances when it is below the fuel level and when it is above the fuel level. The different thermistor resistances are detected by a bridge circuit 10 shown in FIG. 5.

The output of the bridge circuit 10 is supplied to a microcomputer 11. Signals are coupled between the ball-oscillation flow meter 9 and controller 39 so the direction and velocity of fuel flowing through the meter 9 is controlled by the controller (described infra in more detail); Flow velocity indicating pulses derived from output of the flow meter 9 are applied to the microcomputer 11 through the controller 39.

In addition, an initial fuel quantity setting means 13 is connected to the microcomputer 11 having a memory, so it is possible to preset any quantity of initial fuel (the fuel quantity contained in the tank). Indicator 14 displays the quantity of residual fuel.

Figure 4:
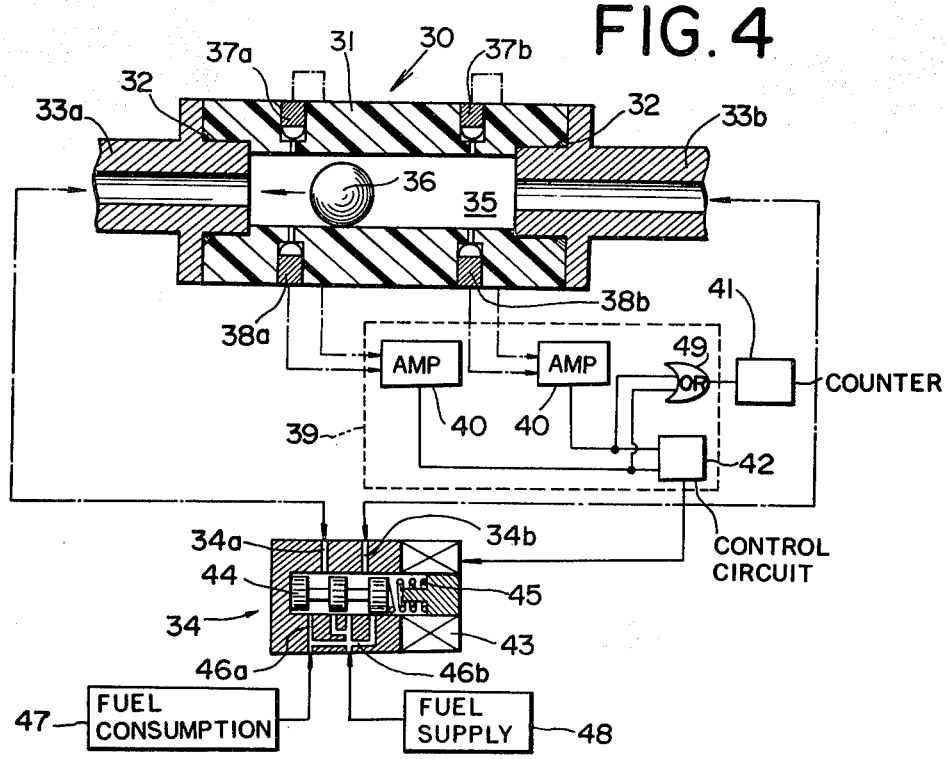
FIG. 4 is a cross sectional view and a schematic block diagram of a ball-oscillation flow meter used with the residual flow meter according to the present invention.

FIG. 4, a more detailed illustration of the ball oscillation flow meter 9 and the controller 39, includes cylinder 30, formed by a straight tube 31 with two connection pipes 33a and 33b fitted thereto; one of pipes 33a and 33b is at each end of tube 31, over two circular sealing rings 32. These two connection pipes 33a and 33b are respectively connected to the ports 34a and 34b of electromagnetic two-way valve 34. In a bore 35 defined by the straight tube 31 and the connection pipes 33a and 33b, there is provided a ball 36, the diameter of which is smaller than the internal diameter of the straight tube 31. It is preferable to make ball 36 of a material having a specific gravity equal to that of the measured liquid, i.e., the fuel.

Near the ends of the bore 35, there are provided two pairs of light-emitting and light-receiving elements 37a and 38a, and 37b and 38b, facing each other across the diameter of the straight tube 31, so that the ball 36 can shut off the light emitted between the two elements whenever it moves to the respective end of the bore. The position sensors, made up of the two pairs of light emitting and light receiving elements 37a and 38a, and 37b and 38b, are connected to two amplifiers 40 provided in a controller 39. Whenever the ball 36 shuts off one beam of light, the corresponding amplifier 40 supplies the respective output signal to a counter 41 which counts the number of the signals from the amplifiers 40. At the same time, the output signals from the amplifiers 40 are also applied to a control circuit 42 which actuates the two-way valve 34 by turning on or off a solenoid 43 in response to the position sensors.

The two-way valve 34 comprises a plunger 44 which is moved right or left against the force of a compression spring 45 by the actuation of the solenoid 43 to switch the communication of ports 46a, 46b and ports 34a, 34b. The port 46a is connected to a liquid consumption means 47, and the port 46b is connected to a liquid supply means 48.

When this flow meter is used in an automotive vehicle, the liquid consumption means 47 could be a carburetor float chamber, and the liquid supply means 48 could be a fuel pump.

When the ball 36 is moved to either end of the bore 35 to block either of the light beams emitted from the position sensors, the two-way valve 34 is switched by the signal produced when the light is shut off so that the flow of the liquid within the bore 35 is reversed, that is, the ball 36 is moved in the opposite direction.

In the flow meter thus constructed, as shown in FIG. 4, when the solenoid 43 is deenergized and the plunger 44 is urged by the force of the compression spring 45, a communicating passageway is formed from the liquid supply means 48, through port 46b, port 34b, connection pipe 33b, bore 35, connection pipe 33a, port 34a, port 46a, to the fuel consumption means 47. Therefore, the liquid within the cylinder moves the ball 36 leftwards in the bore 35 as depicted by the arrow in bore 35, FIG. 4. When this ball 36 has moved to the left-hand side of the cylinder 30, the light emitted from the left-hand position sensor (the light emitting element 37a and the light receiving element 38a) is shut off; the controller 39 detects that the light is shut off; the amplified signals are applied to the solenoid 43 through the control circuit 42 to energize the solenoid 43. When the solenoid 43 is energized, the plunger 44 is moved rightwards to switch the two-way valve 34 so that the communication of ports 46a, 46b and ports 34a, 34b is changed (in this case, the port 46b communicates with port 34a, and 46a communicates with 34b). Accordingly, the liquid flowing through the cylinder 30 is switched in direction, and the ball 36 is moved in the opposite direction to that shown by the arrow in FIG. 4.

When the ball 36 reaches the right-hand side and the light emitted from the other position sensor is shut off, the controller 39 detects this and the two-way valve 34 is switched so that the ball is moved again in the direction shown by the arrow in bore 35, FIG. 4. As described above, so long as the fuel continues to flow from the fuel supply means 48 to the fuel consumption means 47, the ball 36 continues to move to and fro in the cylinder 35.

The number of the reciprocations of the ball is counted by the counter 41 in response to the output signals supplied by amplifiers 40 to OR circuit 49. If the counted value is n, the quantity Q of the liquid flowing through the cylinder 30 is proportional to n. Since a proportionality constant k can be predetermined, it is possible to measure the flow rate according to the value counted by the counter 41.

The fuel within a fuel tank 1 is first introduced into a pump 17, FIG. 2, through a pipe 15 and a filter 16, next to the inlet port 18a of valve 34 which changes the fuel-flow direction and serves as one of the parts of the ball-oscillation flow meter 9. From valve 34 fuel flow to the cylinder bore of the flow meter 9 through a port 18b, back to the electromagnetic two-way valve 34 through a port 18c, and lastly to a carburetor float chamber 8 through an outlet port 18d. Some of the fuel may return to the fuel tank 1 through a return pipe 19 from the inlet port 18a.

Since the specific gravity of the ball 36 within the cylinder bore of the flow meter 9 is almost the same as that of the fuel, the ball 36 moves in the same direction as that in which the fuel flows. When the ball 36 moves to a position to block the light beam emitted from either of the light-emitting elements 37a or 37b attached near the cylinder ends, a light block signal is derived from the corresponding light-receiving element 38a or 38b to energize the electromagnetic two-way valve 34. As a result of this, the direction of the fuel flow through valve 34 is switched. When the ball 36 is moved in the opposite direction to a position to block the light from the other of the light-emitting elements 37a or 37b attached near the cylinder ends, another light block signal is derived from the corresponding light-receiving element 38a or 38b to deenergize the electromagnetic two-way valve 34, thus the direction of fuel flow through valve 34 is reversed back to the initial condition. In the manner described above, the ball 36 oscillates repeatedly within the cylinder bore.

In this case, the output of the OR gate 49 is supplied to the microcomputer 11 from the controller 39 as an indication of the fuel consumption rate. In other words, the controller 39 controls the electromagnetic two-way valve 34 by the output signals from the light-receiving elements 38a and 38b and simultaneously supplies a signal indicating the number of switchings of the ball 36.

Figure 5:
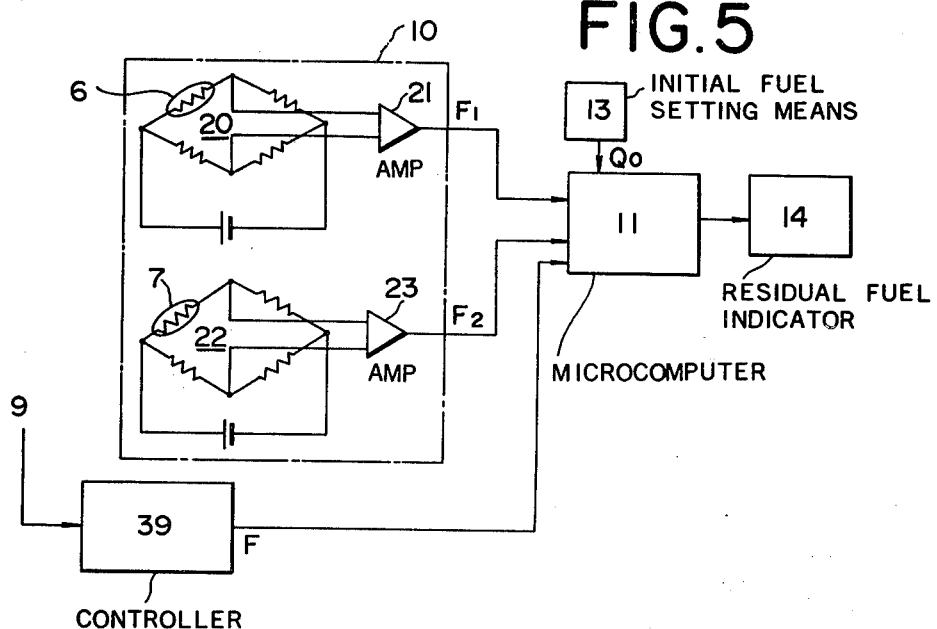
FIG. 5 is a schematic block diagram of a residual fuel indicator according to the present invention.

FIG. 5, a schematic diagram of the residual fuel indicator used with the flow meter, includes bridge circuit 10 comprising first and second bridge portions 20 and 22 respectively including first and second thermistors used as the first and second liquid level sensors 6 and 7 provided with the fuel tank 1. Output signals of bridge portions 20 and 22 are respectively supplied to amplifiers 21 and 23, which respectively derive output signals $F_1$ and $F_2$ that are supplied to the microcomputer 11.

The quantity $Q_0$ of fuel contained within the fuel tank 1 is preset into the initial fuel quantity setting means 13, and stored in the microcomputer 11. In response to each pulse signal F, corresponding to the flow meter output signal applied by controller 39 to the microcomputer 11, the microcomputer 11 subtracts the quantity q of fuel corresponding to this pulse signal F from the quantity of fuel contained in the tank. The residual amount of fuel in tank 1 is indicated on the residual fuel indicator 14. The initial amount of residual fuel in tank 1 is indicated by $Q_0$ so that initially q is subtracted from $Q_0$. The initial residual fuel value and the subtracted result are stored after the ignition has been switched off, because it is necessary for the computer to perform the arithmetical operations again immediately after the ignition is again switched on.

The output of the bridge circuit 10 changes according to changes in the level of the fuel. That is when the fuel level drops below the position of the thermistor of the first fuel level sensor 6, the output $F_1$ is derived to correct the residual fuel quantity displayed on the residual fuel indicator 14 to a value, such as 40 l. Subsequently, when the fuel level drops below the position of the second thermistor of the second fuel level sensor 7, the output $F_2$ is derived to correct the residual fuel quantity displayed on the indicator 14 to 10 l. The residual fuel quantity displayed is corrected for more accurate measurement of the residual fuel.

By positioning a liquid level sensor at the metacenter of the tank, it is possible to further improve the accuracy of measurement of the residual fuel quantity, because the detection of the fuel level is not affected when the vehicle is not level.

Another problem is that the quantity of residual fuel is not stably displayed when the vehicle moves from side to side. This is because the bridge portions 20 and 22 derive signals $F_1$ and $F_2$ irregularly when the vehicle suddenly moves to disturb the fuel level so that the fuel level sensors derive an erroneous signal $F_1$ or $F_2$. To overcome this trouble, the microcomputer 11 executes a program only in response to the leading edges of the signals $F_1$ and $F_2$ derived from the bridge circuit 10 correct the residual fuel quantity displayed on the indicator 14. Computer 11 and indicator 14 respond to these edges during the interval between adjacent fillings of fuel tank 1; the initial residual fuel quantity is reset each time tank 1 is filled.

Figure 6:
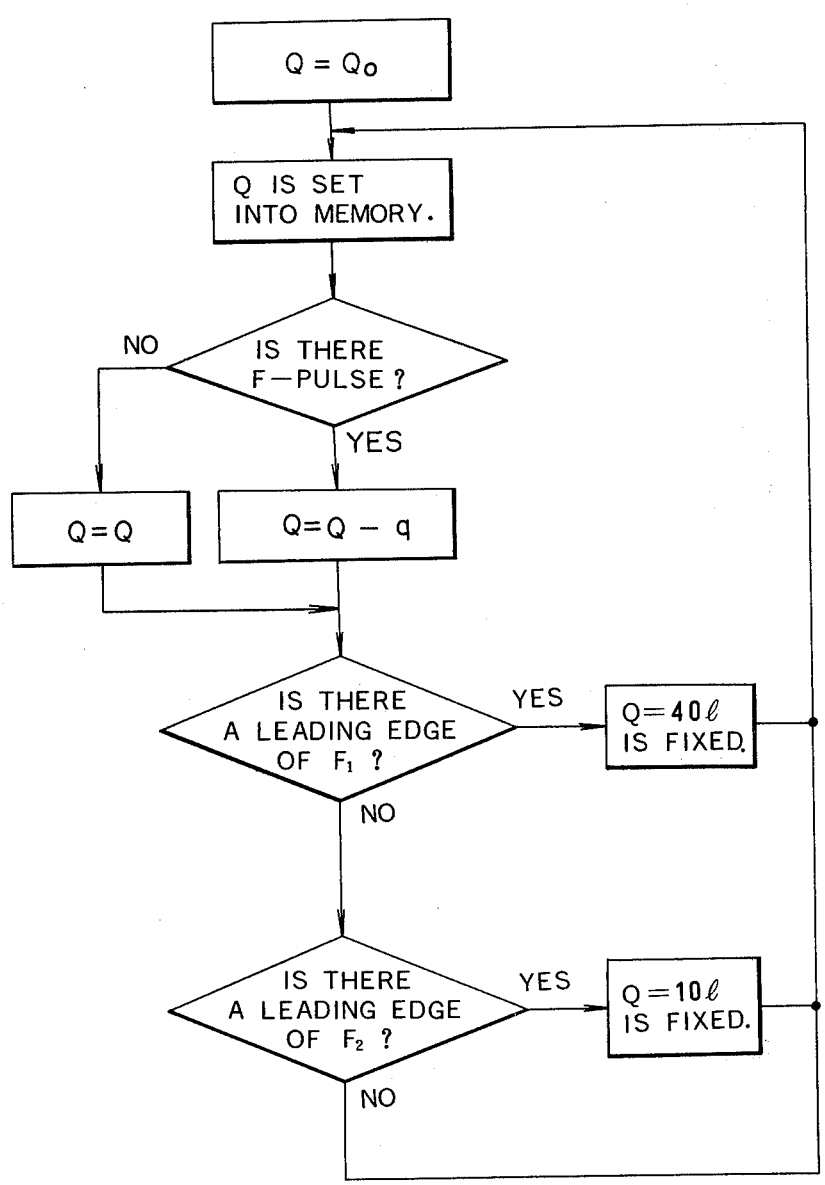
FIG. 6 is a flowchart of an arithmetic operation program executed by the microcomputer used for indicating the residual fuel quantity according to the present invention.

FIG. 6 is a flowchart of the arithmetic operations executed by the microcomputer to display the quantity of residual fuel. With reference to FIG. 6, first the quantity $Q_O$ of the fuel contained within the fuel tank 1 is preset into the microcomputer as $Q=Q_O$ through the initial fuel quantity setting device 13. Next, the presence or absence of the pulse F (which corresponds to q cc per pulse) from the controller 39 is determined. In response to each pulse F from the controller, the arithmetic operation of $Q=Q-q$ is executed; if there is no pulse F, $Q=Q$ is set. As the fuel is consumed and fuel level drops below the position of the thermistor of the fuel level sensor 6, a pulse $F_1$ is derived from the bridge portion 20 of the bridge circuit 10 to set the residual fuel display to a predetermined quantity (in this embodiment, for instance: 40 liters). While the fuel is consumed, the operation Q-q is executed. When the fuel level drops below the position of the thermistor of the fuel level sensor 7 pulse signal $F_2$ is supplied by bridge portion 22 to microcomputer 11 to correct the residual fuel quantity display (in this embodiment for instance: 10 liters).

In the embodiment described hereinabove, a ball-oscillation flow meter is used as the fuel flow meter; however, it is of course possible to use other flow meters; such as a free-piston flow meter. Also, it is possible to use various fuel level sensors other than those of the thermistor type.

As described above, in the residual fuel meter according to the present invention, the fuel quantity contained within the tank is read into the memory of microcomputer 11, the consumed fuel quantity is measured by the flow meter, a subtraction operation is executed to derive a residual fuel signal, the fuel level sensors are fixed at predetermined positions and the residual fuel quantity is corrected whenever the respective fuel level sensors derive a detection signal. This construction improves the accuracy of the measurement of the fuel level within the fuel tank, irrespective of the state of the fuel level, which is often unstable because of the movement and vibration of the vehicle. In addition, the residual fuel meter according to the present invention has a superior fast response time and is durable, compared to conventional float-type flow meters, because there are no moving parts within the fuel tank.

It will be understood by those skilled in the art that the foregoing description is in terms of preferred embodiments of the present invention wherein various changes and modifications may be made without departing from the spirit and scope of the invention, as is set forth in the appended claims.

What is claimed is:
1. A residual-fuel meter for an automotive vehicle, which comprises:
(a) initial fuel setting means for presetting the initial quantity of fuel within the fuel tank;
(b) consumed-fuel measuring means for measuring the fuel consumed from the fuel tank;
(c) a microcomptuer for storing the quantity of initial fuel preset by said initial fuel setting means and the quantity of consumed fuel measured by said consumed fuel measuring means and for calculating the quantity of residual fuel by subtracting the consumed fuel quantity from the initial fuel quantity; and
(d) a residual fuel indicator for displaying the residual fuel quantity calculated by said microcomputer;
said consumed-fuel measuring means for measuring the fuel consumed including a ball oscillation flow meter comprising:
(a) a cylinder bore;
(b) a ball movably disposed within said cylinder bore, the specific gravity of said ball being almost the same as that of the fuel, said ball being moved in the same direction as that of fuel flow;

(c) a pair of position sensors including light-emitting elements and light-receiving elements for respectively deriving signals whenever said ball blocks the light emitted from said light emitting elements at either end of said bore;

(d) a two-way valve for reversing the direction of fuel flow in response to the signals derived by said position sensors; and (e) a counter for counting the number of the signals from said position sensors to measure the quantity of flow.

2. A residual-fuel meter for an automotive vehicle for indicating the quantity of fuel in a fuel tank of the vehicle, comprising:

(a) initial fuel setting means for presetting an indication of the initial quantity of fuel in the fuel tank;

(b) consumed-fuel measuring means for measuring the fuel consumed from the fuel tank;

(c) a microcomputer for storing an indication of the quantity of initial fuel preset by said initial fuel setting means and the quantity of consumed fuel measured by said consumed-fuel measuring means and for calculating the quantity of residual fuel by subtracting the consumed fuel quantity from the initial fuel quantity;

(d) a residual fuel indicator for displaying the residual fuel quantity calculated by said microcomputer;

(e) a fuel level sensor disposed at an appropriate predetermined fuel level position within the fuel tank; and (f) means responsive to said fuel level sensor for supplying a correction signal to said microcomputer, the microcomputer responding to the correction signal to correct the display indicated on said residual fuel indicator to a value suitable to the current residual fuel quantity when the fuel level is below the predetermined fuel level.

3. The residual-fuel meter of claim 2 wherein said consumed-fuel measuring means for measuring the fuel consumed is a ball oscillation flow meter comprising:

(a) a passage connected in fluid flow relation with fuel consumed from the tank;

(b) a mass movably disposed within said passage, the specific gravity of said mass being almost the same as that of the fuel, said mass being responsive to the fuel flowing in the passage to be moved in the same direction as that of fuel flow;

(c) a pair of position sensors including light-emitting elements and light-receiving elements for respectively deriving signals whenever said mass blocks the light emitted from said light emitting elements at either end of said bore;

(d) a two-way valve for reversing the direction of fuel flow in the passage in response to the signals derived from said position sensors; and (e) a counter for counting the number of signals from said position sensors to measure the quantity of flow.

4. The residual-fuel meter of claim 2 wherein said means responsive to said fuel level sensor is a bridge circuit including said fuel level sensor, said level sensor being a resistive element.

5. The residual-fuel meter of claim 4 wherein said resistive element is a thermistor.

6. The residual-fuel meter of claim 5 wherein said thermistor is located in and protected by a casing having a surface with two small holes.

7. The residual-fuel meter of claim 4 wherein said bridge circuit derives a signal having a leading edge in response to the level being detected, the correction signal supplying means being responsive only to the leading edge to correct the display on the residual fuel indicator between adjacent fillings of the fuel tank, whereby the display is stably correct even while the vehicle moves from side to side.

8. Apparatus for indicating the amount of liquid in a reservoir from which the liquid flows comprising computer means, reservoir liquid level measuring means responsive to the level of the liquid in the reservoir being at a predetermined level for setting the computer means to a value indicative of the predetermined level, means for monitoring the flow of the liquid from the reservoir, and means responsive to the flow monitoring means for altering the value set in the computer means so the computer means derives a signal indicative of the amount of residual liquid in the reservoir, the flow monitoring means including means for deriving a pulse in response to a predetermined flow volume from the reservoir, the altering means responding to each pulse so each pulse changes the value set in the computer means.

9. The apparatus of claim 8 further including means for setting an initial value of the liquid in the reservoir into the computer means.

10. The apparatus of claim 8 wherein the flow monitoring means includes a mass responsive to the liquid flowing from the reservoir so the mass moves at a rate indicative of the liquid flow rate, and means responsive to the movement of the mass for deriving one of the pulses each time the mass moves through a predetermined distance.

11. The apparatus of claim 8 wherein the flow monitoring means includes a mass oscillating between first and second limits in response to the liquid flowing from the reservoir so the mass moves between the limits at a rate indicative of the liquid flow rate, means for reversing the oscillating direction of the mass in response to the mass reaching the first and second limits, and means responsive to the mass reaching each of the limits for deriving one of the pulses.

12. Apparatus for indicating the amount of liquid in a reservoir from which the liquid flows comprising computer means, reservoir liquid level measuring means responsive to the level of the liquid in the reservoir being at a predetermined level for setting the computer means to a value indicative of the predetermined level, means for monitoring the flow of the liquid from the reservoir, means responsive to the flow monitoring means for altering the value set in the computer means so the computer means derives a signal indicative of the amount of residual liquid in the reservoir, and means for setting an initial value of the liquid in the reservoir into the computer means.

13. Apparatus for indicating the amount of liquid in a reservoir from which the liquid flows comprising computer means, reservoir liquid level measuring means responsive to the level of the liquid in the reservoir being at a predetermined level for setting the computer means to a value indicative of the predetermined level means for monitoring the flow of the liquid from the reservoir, and means responsive to the flow monitoring means for altering the value set in the computer means so the computer means derives a signal indicative of the amount of residual liquid in the reservoir, the reservoir liquid level monitoring means deriving a signal having a leading edge in response to the liquid level dropping to the predetermined level, the computer means responding to the leading edge for setting the predetermined level value.

* * * * *